(12) United States Patent
Hosoya et al.

(10) Patent No.: US 7,341,755 B2
(45) Date of Patent: Mar. 11, 2008

(54) METHOD FOR MAKING BREADS

(75) Inventors: Seio Hosoya, Tokyo (JP); Yuji Yamada, Tokyo (JP)

(73) Assignee: Yamazaki Seipan Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/405,346

(22) Filed: Apr. 3, 2003

(65) Prior Publication Data

US 2004/0161518 A1   Aug. 19, 2004

(30) Foreign Application Priority Data

Feb. 17, 2003   (JP) ............................ 2003-037637

(51) Int. Cl.
*A21D 2/00* (2006.01)

(52) U.S. Cl. ....................... 426/549; 426/496; 426/653

(58) Field of Classification Search ................. 426/549, 426/653, 496, 94
See application file for complete search history.

(56) References Cited

U.S. PATENT DOCUMENTS

| | | | |
|---|---|---|---|
| 3,304,183 A | | 2/1967 | Johnston et al. |
| 3,777,038 A | | 12/1973 | Thompson |
| 3,803,292 A | | 4/1974 | Bell |
| 3,882,251 A | | 5/1975 | Bell |
| 3,959,496 A | | 5/1976 | Jackel et al. |
| 5,030,466 A | * | 7/1991 | Kageyama et al. .......... 426/502 |
| 5,505,977 A | * | 4/1996 | Neumeister .................. 426/549 |

FOREIGN PATENT DOCUMENTS

| | | |
|---|---|---|
| CA | 923755 A1 | 4/1973 |
| GB | 1103742 | 2/1968 |
| GB | 1 247 097 | 9/1971 |
| GB | 1 299 654 | 12/1972 |
| GB | 2 264 429 A | 9/1993 |
| JP | 51-33981 | 9/1976 |
| JP | 54-52741 A | 4/1979 |
| JP | 8-116857 A | 5/1996 |
| JP | 3131898 B2 | 11/2000 |

OTHER PUBLICATIONS

Baking Science & Technology, 1988, pp. 346-348.*
T. Cogswell, American Society of Bakery Engineers, Technical Bulletin #240, Oct. 1997.
K. Himata et al., Food Additives and Contaminants, vol. 11, No. 5, pp. 559-569 (1994).
K. Himata et al., Food Additives and Contaminants, vol. 14, No. 8, pp. 809-818 (1997).
E. Jaska et al., Cereal Chemistry, vol. 52, No. 5, pp. 726-738 (1975).
V. A. De Stefanis et al., Cereal Chemistry, vol. 65, No. 3, pp. 257-261 (1988).
Baking Management, May 1997, pp. 42-44.
Milling & Baking News, Mar. 18, 1997, pp. 19-20.
General Foods World, vol. 45, No. 3, Mar. 2000, pp. 111-120.
(Reprint from) "ACS Symposium-Series 816—Bioactive Compounds in Foods: Effects of Processing and Storage," published 2002 by the American Chemical Society, pp. 218-227.

* cited by examiner

*Primary Examiner*—Lien Tran
(74) *Attorney, Agent, or Firm*—Birch, Stewart, Kolasch & Birch, LLP

(57) ABSTRACT

There has been a need to develop a method for preparing a bread dough using potassium bromate, an excellent bread improver, which provides baked breads free from residual bromate without affecting the flavor and taste of the breads. It has also been desired to develop a method for making breads using such a bread dough. The present invention provides a method for preparing a bread dough, which comprises incorporating potassium bromate as an aqueous solution, in combination with ferrous sulfate and ascorbic acid in the step of forming a sponge dough such that the solubility of the incorporated potassium bromate is increased in the bread dough to facilitate chemical decomposition of bromate, so that the resulting baked breads are free from residual bromate or have a reduced content of residual bromate. Also provided is a method for making breads, which comprises baking the bread dough.

4 Claims, No Drawings

METHOD FOR MAKING BREADS

This nonprovisional application claims priority under 35 U.S.C. § 119(a) on patent application Ser. No(s). 37637/2003 filed in JAPAN on Feb. 17, 2003, which is(are) herein incorporated by reference.

BACKGROUND OF THE INVENTION

The present invention relates to a method for making breads, more specifically, by incorporating potassium bromate as an oxidizing agent into a bread dough, wherein the resulting baked breads are free from residual bromate.

Potassium bromate has been widely used in the world since 1910s when it was recommended as a bread improver in the United States. In Japan, there is a guideline for use of potassium bromate, stating that "potassium bromate is limited to use for yeast leavened bakery products in an amount of up to 0.03 g (as bromate) per kg of wheat flour (i.e., 30 ppm based on wheat flour) and should be decomposed or removed before completing final products," that is, potassium bromate must not remain in the products after baking.

In conventional techniques, prevention of residual bromate in bakery products has been accomplished, either by using sufficient time for fermentation and baking of a dough to ensure complete chemical reaction of bromate or by incorporating a reduced amount of potassium bromate, or both.

The inventors of the present invention have already developed a method for prevention or reduction of residual bromate in bakery products by incorporating ascorbic acid (see, e.g., JP 8-116857 A).

The limitation "bromate should be decomposed or removed" or "bromate must not remain" in the Japanese guideline is intended to mean that bromate cannot be detected when measured by the most sensitive analysis at the time of the measurement, i.e., that bromate is below the detection limit. In view of this limitation, the inventors of the present invention have attempted to incorporate ferrous sulfate in the step of preparing a dough using potassium bromate and have succeeded in reducing residual bromate in bakery products to less than 3 ppb, a non-detectable level as measured by their developed ultra-sensitive HPLC (high performance liquid chromatography) analysis with a detection limit of 3 ppb for bromate in the baked breads (see, e.g., Japanese Patent No. 3131898).

However, the term "free from residual bromate" or "prevention of residual bromate" as used herein is intended to mean that bromate does not remain in an amount greater than 1 ppb, the "detection limit for bromate" as measured by further improved state-of-the-art HPLC analysis at the filing of the present invention.

However, the above conventional techniques neither confirm their efficacy for complete removal or significant reduction of residual bromate in breads, nor disclose the incorporation of potassium bromate as an aqueous solution. Further, in these conventional techniques, ferrous sulfate is incorporated in an amount of 50 ppm to 370 ppm based on total wheat flour required to prepare a dough, which amount significantly exceeds the range acceptable for the breads of the present invention to maintain the loaf volume, flavor and taste of breads.

SUMMARY OF THE INVENTION

There has been a need to develop a method for preparing a bread dough which allows improvements in the quality of baked breads by incorporating potassium bromate into the bread dough and which provides breads completely free from the incorporated bromate or with a bromate content reduced to less than 1 ppb, the detection limit for bromate. It has also been desired to develop a method for making breads using such a bread dough.

The inventors of the present invention modified the above conventional techniques to use ferrous sulfate in an amount reduced to an acceptable range to maintain the loaf volume, flavor and taste of baked breads, confirming very effective results in pullman type bread baked in covered baking pans because potassium bromate of even 15 ppm (possibly the upper limit of the optimal range) produced no detectable residual bromate in this type of bread, as measured by the analysis mentioned above.

In contrast, in open top bread baked in uncovered baking pans, it was found that residual bromate could be detected in an amount slightly over the range discussed above.

The inventors of the present invention analyzed difference in residual bromate between breads baked in covered and uncovered baking pans, and discovered the following findings. The findings led to the completion of the present invention.

Namely, in the conventional techniques, potassium bromate in powder form was incorporated into a bread dough. Potassium bromate has a relatively low solubility in water. In open top bread, water would be evaporated from the uncovered (i.e., exposed) upper surface of the dough in an early stage of the baking step, followed by upper crust formation. As a result, potassium bromate could not be completely dissolved into the bread dough near the upper surface before the completion of baking and hence it would remain near the upper crust upon completion of baking because sufficient chemical decomposition of bromate would not occur.

The inventors of the present invention found that the above problems associated with conventional techniques could be overcome by incorporating potassium bromate in the step of preparing a bread dough such that the solubility of the incorporated potassium bromate is increased in the bread dough to facilitate chemical decomposition of bromate.

The present invention thus provides the following methods aimed at incorporating potassium bromate in the step of preparing a bread dough such that the solubility of the incorporated potassium bromate is increased in the bread dough to facilitate chemical decomposition of bromate. Namely, the present invention provides a method for preparing a bread dough by the sponge and dough process, which comprises incorporating potassium bromate as an aqueous solution, in combination with ferrous sulfate and ascorbic acid in the step of forming a sponge, so that the resulting baked breads are free from residual bromate, and a method for making breads which comprises baking the bread dough.

Also provided are a method for preparing a bread dough which allows improved oven spring in the baking step and hence increased loaf volume, and a method for making breads which comprises baking the bread dough.

Further provided are a method for preparing a bread dough, which comprises incorporating a significantly reduced amount of ferrous sulfate, so that the loaf volume, flavor and taste of baked breads are not affected by ferrous sulfate, and a method for making breads which comprises baking the bread dough.

DETAILED DESCRIPTION OF THE INVENTION

The present invention is therefore directed to a method for preparing a bread dough by the sponge and dough process, which comprises incorporating potassium bromate as an aqueous solution, in combination with ferrous sulfate and ascorbic acid in the step of forming a sponge, so that the resulting baked breads are free from residual bromate.

In the present invention, as stated below, it is necessary not only to prepare a bread dough by the sponge and dough process, but also to incorporate three ingredients, potassium bromate in aqueous solution form, ferrous sulfate and ascorbic acid, in the step of forming a sponge.

First, potassium bromate is incorporated in the form of an aqueous solution prepared by dissolving powdered potassium bromate in water. This aqueous solution of potassium bromate may be prepared by simple or ultrasonic stirring of potassium bromate in water or by any other technique for aqueous solution preparation.

For incorporation into a bread dough, potassium bromate should be completely dissolved in water, but may be set to any desired concentration. Potassium bromate has a relatively low and temperature-dependent solubility in water. It has a lower solubility at a lower temperature and its maximum solubility in water at 0° C. is 3%. Water temperature for bread dough preparation is usually higher than 0° C. and potassium bromate can be dissolved in an amount of 3% or more. However, an aqueous solution of potassium bromate should have a concentration not higher than 3%, and in particular not higher than 2%, in order to avoid precipitation of potassium bromate during bread dough preparation.

On the other hand, with respect to the lower concentration limit for an aqueous solution of potassium bromate, a lower concentration can be advantageous in ensuring a higher solubility and more uniform dispersion of potassium bromate in a bread dough as well as in ensuring more accurate and easier metering of potassium bromate. However, too low a concentration will affect handling and suitability for bread making because there arises a need to incorporate a large volume of such an aqueous solution. The lower concentration limit may therefore be adjusted to meet both requirements.

An aqueous solution of potassium bromate may preferably be incorporated in an amount of 8 ppm to 15 ppm (as potassium bromate) based on total wheat flour required to prepare a bread dough. In the case of making open top bread, it is more preferably incorporated in an amount of 8 ppm to 12 ppm, and even more preferably 10 ppm to 12 ppm. In the case of making pullman type bread, it is more preferably incorporated in an amount of 11 ppm to 15 ppm, and even more preferably 11 ppm to 13 ppm. This allows potassium bromate to sufficiently exhibit its inherent oxidizing effect, and as a result, a bread dough will have improved oven spring when baked. Using such a bread dough achieves improved bread-making properties such as increased loaf volume and improved flavor of baked breads. Further, in both cases of pullman type and open top breads, baked breads can be substantially free from residual bromate by merely incorporating a significantly small amount of ferrous sulfate.

Too small an amount of potassium bromate may fail to achieve the improved bread-making properties mentioned above, while too large an amount of potassium bromate may also fail to achieve the improved bread-making properties. In the case of too large an amount, it is also necessary to incorporate a larger amount of ferrous sulfate to achieve prevention of residual bromate in baked breads, particularly in open top bread. However, such a larger amount of ferrous sulfate will affect the loaf volume, flavor and taste of baked breads. Further, there still remains a risk of residual bromate in baked breads even when a larger amount of ferrous sulfate is incorporated.

Ferrous sulfate has the chemical formula $FeSO_4$ and can be available in crystal (7-hydrate) or dry (1-to 1.5-hydrate) form, which are designated as ferrous sulfate (crystal) and ferrous sulfate (dry), respectively. In Japan, ferrous sulfate (crystal) was accepted as a food additive in 1957, followed by ferrous sulfate (dry) in 1964. They are collectively referred to as ferrous sulfate.

Ferrous sulfate is prepared from iron and dilute sulfuric acid as follows:

$$Fe + H_2SO_4 + 7H_2O \rightarrow FeSO_4 \cdot 7H_2O(crystal) + H_2$$

The dry form is prepared by drying the crystal thus prepared at 40° C. to give powder. Although ferrous sulfate as used herein may be in either crystal or dry form, the dry form ($FeSO_4 \cdot 1$-$1.5H_2O$) was used in the Examples because of its higher purity.

When incorporated into a bread dough (including a sponge dough), ferrous sulfate serves as a good iron enrichment in relation to the bread dough, while it serves as a reducing agent or its equivalent in relation to potassium bromate to ensure complete chemical reaction of bromate. The present invention was completed based on this finding in principle.

Ferrous sulfate may preferably be incorporated in an amount of 10 ppm to 20 ppm, more preferably 13 ppm to 17 ppm, and even more preferably 14 ppm to 16 ppm, based on total wheat flour required to prepare a bread dough. On the precondition that potassium bromate is incorporated as an aqueous solution, such an amount of ferrous sulfate successfully ensures prevention or reduction of residual bromate in baked breads (including both pullman type and open top breads), without affecting bread-making properties or the quality of baked breads. An amount of ferrous sulfate exceeding 16 ppm tends to slightly darken the crumb texture of baked bread. An amount exceeding 20 ppm will affect, to a greater or lesser degree, the loaf volume, flavor and taste of baked breads., depending on bread-making conditions. In contrast, an amount of ferrous sulfate less than 10 ppm may fail to ensure prevention or reduction of residual bromate in baked breads, depending on bread-making conditions.

According to the present invention, in addition to potassium bromate in aqueous solution form and ferrous sulfate, ascorbic acid is incorporated in the step of forming a sponge of the bread dough. Ascorbic acid as used herein is intended to mean L-ascorbic acid.

When further incorporated into the bread dough, ascorbic acid ensures not only greater prevention of residual bromate in baked breads (including both pullman type and open top breads), but also greater improvements in bread-making properties and in the quality of baked breads. With respect to reduction of residual bromate, the bread dough of the present invention appears to contain $Fe^{3+}$ generated from chemical decomposition of bromate by ferrous sulfate added thereto. However, $Fe^{3+}$ is difficult to chemically react with bromate. Ascorbic acid, when incorporated into the bread dough, serves as a reducing agent not only to directly decompose bromate through chemical reaction, but also to indirectly contribute to additional chemical decomposition through conversion of $Fe^{3+}$ present in the bread dough (which is difficult to chemically react with bromate) into $Fe^{2+}$ (which is easy to chemically react with bromate).

Next, the improvements in bread-making properties and in the quality of baked breads will be explained as follows. Potassium bromate has very narrow optimal ranges for amounts to be incorporated as well as for temperatures and time for fermentation and baking to ensure that its action in a bread dough is sufficient. However, addition of ascorbic acid allows these optimal ranges to be extended, easing the conditions for bread making. Although incorporating breads (particularly pullman type breads) with potassium bromate is more likely to cause caving, this phenomenon can also be blocked by addition of ascorbic acid.

Ascorbic acid available for use may be uncoated ascorbic acid, ascorbic acid partially or completely coated with a fat, or ascorbic acid partially or completely coated with a mixture of a fat and an emulsifier such as a mono-glyceride fatty acid ester.

Ascorbic acid may preferably be incorporated in an amount of 10 ppm to 50 ppm based on total wheat flour required to prepare a bread dough. In the present invention, a larger amount of ascorbic acid will be desirable in view of ensuring prevention of residual bromate in breads. More specifically, it is more preferably incorporated in an amount of 20 ppm to 50 ppm, and even more preferably 30 ppm to 50 ppm. In contrast, a smaller amount of ascorbic acid will be desirable in view of ensuring improvements in bread-making properties and in the quality of breads by allowing potassium bromate to exhibit its inherent oxidizing effect in a bread dough. More specifically, it is more preferably incorporated in an amount of 10 ppm to 40 ppm, and even more preferably 10 ppm to 30 ppm. Thus, the most desirable amount of ascorbic acid used in the present invention can be 20 ppm to 30 ppm in view of meeting both requirements.

Preferably, either or both (more preferably both) of ferrous sulfate and ascorbic acid may be incorporated in powder form, independently of the above aqueous solution of potassium bromate. If ferrous sulfate is used as an aqueous solution, the iron ion ($Fe^{2+}$) in ferrous sulfate, capable of reacting with and decomposing bromate, would be affected and hence lose its ability to decompose bromate.

Likewise, if ascorbic acid is incorporated as an aqueous solution, potassium bromate would be decomposed before exhibiting its inherent oxidizing effect in a bread dough, which adversely affects improvements in bread-making properties and in the quality of baked breads.

Ascorbic acid and ferrous sulfate may each be incorporated alone or as a mixture with one or more members selected from yeast foods, enzymes, emulsifiers and other dough conditioners. Preferably, they may be incorporated as a mixture.

In the present invention, it is necessary not only to prepare a bread dough by the sponge and dough process, but also to incorporate three ingredients, potassium bromate in aqueous solution form, ferrous sulfate and ascorbic acid, in the step of forming a sponge.

The sponge and dough process refers to a technique for bread dough preparation, which usually involves:

forming a sponge by mixing part of wheat flour required to prepare a bread dough with yeast and water, optionally in combination with one or more members selected from dough conditioners (e.g., yeast foods, oxidants, enzymes), emulsifiers, salt, and other materials or additives;

fermenting the sponge under given conditions;

making a dough by mixing the fermented sponge with the rest of the wheat flour, salt and water, optionally in combination with one or more members selected from sugars, fats, skimmed milk powder, and other materials or additives, to prepare a bread dough; and fermenting (floor time) the bread dough under given conditions.

In the sponge and dough process of the present invention, the amount of wheat flour used to form a sponge should be 50% to 80% by mass, preferably 60% to 80% by mass of total wheat flour required to prepare a bread dough. If a larger or smaller amount of wheat flour is used to form a sponge, the resulting bread dough would lack fermentation stability and mechanical tolerance, which are features of the sponge and dough process.

In addition, the mixed sponge should be fermented at a temperature of 26° C. to 29° C., preferably 27° C. to 28° C., for 4 to 6 hours, preferably 4 to 5 hours. If the sponge is fermented at a lower temperature or for a shorter period of time, a young sponge would be formed and the resulting bread dough would lack fermentation stability and mechanical tolerance, which are features of the sponge and dough process. Such a young sponge would not only affect the quality of breads, but also give rise to insufficient chemical reaction among potassium bromate, ferrous sulfate and ascorbic acid. Likewise, if the sponge is fermented at a higher temperature or for a longer period of time, an overfermented old sponge would be formed and the resulting bread dough would also lack the above features of the sponge and dough process and affect the quality of breads.

Thus, the present invention requires an extended period of time for the entire process, from start of mixing (including sponge mixing) to completion of baking, and accordingly a longer period of time will be provided for chemical reaction among potassium bromate, ferrous sulfate and ascorbic acid incorporated in the step of sponge mixing. As a result, sufficient decomposition of bromate will occur to ensure prevention of residual bromate in breads.

The present invention encompasses a method for making breads, which comprises baking the bread dough prepared by the method for preparing a bread dough discussed above.

The term "breads" as used herein is specifically intended to mean, but not limited to, open top or pullman type breads obtained by baking a bread dough placed in a rectangular baking pan having a rectangular bottom and 4 side walls standing upright from and surrounding the bottom. The bread dough is proofed before baking and optionally covered with a rectangular lid during baking.

The method of the present invention can be used to provide breads free from residual bromate, in both cases of pullman type and open top breads. The method is particularly preferred for use in making open top bread baked in an uncovered baking pan.

Further, in the method for making breads of the present invention, the bread dough may be baked at low temperature, if desired. More specifically, this low temperature baking may be carried out under an atmosphere at 160° C. to 180° C. In general, the baking temperature for breads is around 200° C. to 220° C. In the case of incorporating potassium bromate, in particular, it has been believed that a higher baking temperature and a longer baking time are desirable for further reduction of residual bromate in breads. In contrast, the present invention allows prevention of residual bromate in breads, including both pullman type and open top breads, even at a baking temperature as low as 160° C. to 180° C. Further, the period of time required for baking at such a low temperature may be set to any value as long as it is not extremely shorter than that of conventional baking at the temperature as mentioned above. However, for prevention of residual bromate in baked breads, it can be desirable to use a longer baking time than that of conventional baking at the temperature as mentioned above.

Thus, the present invention is preferably adapted to a method for making tender-type breads with an uncolored or light-colored and/or tender crust. Of course, it is also preferred for tender-type open top bread with such a crust.

If desired, the method of the present invention may further comprise spraying an aqueous solution of ferrous sulfate, an aqueous solution of ascorbic acid, an aqueous solution of ferrous sulfate and ascorbic acid, or water over the (upper) surface of the proofed bread dough before baking.

The above aqueous solution or water may be desirably sprayed in an amount of 3 to 7 g per 450 cm$^2$. Too small an amount per unit area results in a decrease in the reduction of residual bromate in breads, such as in the case of incorporating a larger amount of potassium bromate. Too large an amount results in crusty breads with a hard (upper) surface crust, like a baguette, losing their characteristic soft texture. Likewise, even when sprayed in a larger amount, the above aqueous solution or water would not significantly enhance the reduction of residual bromate in breads. A unit area of 450 cm$^2$ corresponds to the upper open area (internal area) of a normal baking pan.

Thus, the present invention allows greater prevention of residual bromate in open top bread by spraying the above aqueous solution or water over the surface of the proofed bread dough before baking, as compared to open top bread baked without spraying. This embodiment is therefore extremely effective in incorporating a relatively large amount of potassium bromate.

As stated above, the present invention can provide breads free from residual bromate, i.e., those with a bromate content reduced to less than 1 ppb, the detection limit for bromate as measured by improved HPLC analysis.

This HPLC analysis, which was developed by the inventors of the present invention as stated above, is an ultra-sensitive high performance liquid chromatography with a detection limit of 1 ppb for bromate in breads. Details of this analysis can be found on pages 221-224 of the Journal of the Food Hygienics Society of Japan, Vol. 43, No. 4 (August, 2002).

EXAMPLES

The present invention will be further described in the following Examples and Test Examples, which are not intended to limit the scope of the invention.

Example 1

Making Open Top Bread

The amount of each ingredient is expressed as % by mass or ppm based on total wheat flour (the same applying hereinafter).

| | (Ingredient composition) | |
|---|---|---|
| Sponge | Wheat flour (strong flour) | 70% |
| | Yeast | 2% |
| | Dough conditioner (e.g., yeast food, enzyme) including L-ascorbic acid (uncoated) | 0.1% 20 ppm |
| | Emulsifier | 0.3% |

| | -continued | |
|---|---|---|
| | Water | 40% |
| | Aqueous potassium bromate solution (0.13% as concentration) (as potassium bromate) | 11.7 ppm |
| | Ferrous sulfate | 15 ppm |
| Dough | Wheat flour (strong flour) | 30% |
| | Sugar | 5% |
| | Fat | 5% |
| | Skimmed milk powder | 2% |
| | Salt | 2% |
| | Water | 25% |
| | (Process steps) | |
| Sponge | Mixing | Low speed 3 minutes, High speed 2 minutes |
| | Temperature of mixed sponge | 24° C. |
| | Fermentation | 4 hours |
| Dough | Mixing | Low speed 2 minutes, High speed 3 minutes ↓ (add fat) Low speed 2 minutes, High speed 4.5 minutes |
| | Temperature of mixed dough | 27° C. |
| | Floor time | 20 minutes |
| | Dividing | 520 g |
| | Rounding | |
| | Bench time | 20 minutes |
| | Moulding (curl each sheeted dough into a roll) | |
| | Panning (place two moulded rolls into a baking pan) | |
| | Final proofing | 38° C., 70 minutes |
| | Baking (uncovered) | 170° C., 30 minutes |

Open top bread was made under these conditions. Low temperature baking was carried out to give tender-type open top bread with a light-colored tender crust.

(Evaluation)

Content of residual bromate was determined as described in the Journal of the Food Hygienics Society of Japan, supra.

(Result)

The bread was evaluated for the content of residual bromate as described above (detection limit: 1 ppb, the same applying hereinafter), indicating that residual bromate was non-detected (ND, the same applying hereinafter).

This demonstrates that the present invention allows prevention of residual bromate in open top bread by incorporating potassium bromate as an aqueous solution, in combination with a much smaller amount of ferrous sulfate (about 10-fold less than that of the conventional techniques) and an appropriate amount of ascorbic acid.

The open top bread thus prepared was found to show improved oven spring and increased loaf volume in the baking step, as well as having good loaf volume, flavor and taste which were not affected by ferrous sulfate.

Examples 2 to 6

(Ingredient Composition)

The same ingredients as shown in Example 1 were used, except that an aqueous potassium bromate solution was incorporated in an amount as potassium bromate of 8 ppm (Example 2), 9 ppm (Example 3), 10 ppm (Example 4), 11 ppm (Example 5) or 13 ppm (Example 6).

(Process Steps)

The same steps as shown in Example 1 were repeated.

(Results)

The open top bread from each example was evaluated for the content of residual bromate as described above, indicating that residual bromate was ND in Examples 2 to 5 and 1.4 ppb in Example 6.

The open top bread thus prepared was found to show improved oven spring and increased loaf volume in the baking step, as well as having good loaf volume, flavor and taste which were not affected by ferrous sulfate.

Examples 7 to 9

(Ingredient Composition)

The same ingredients as shown in Example 1 were used, except that L-ascorbic acid was incorporated in an amount of 30 ppm (Example 7), 40 ppm (Example 8) or 50 ppm (Example 9).

(Process Steps)

The same steps as shown in Example 1 were repeated.

(Result)

The open top bread from each example was evaluated for the content of residual bromate as described above, indicating that residual bromate was ND in each case of incorporating L-ascorbic acid in an amount of 30 ppm, 40 ppm and 50 ppm.

This demonstrates that the present invention allows prevention of residual bromate in open top bread when L-ascorbic acid is incorporated in an amount of 20 ppm (Example 1) to 50 ppm.

However, a larger amount of L-ascorbic acid, particularly 40 ppm or 50 ppm, tended to give a stiff dough because gluten was more likely to tighten up during mixing in the presence of a larger amount of L-ascorbic acid, thus slightly inhibiting oven spring in the baking step and making breads tough.

Example 10

(Ingredient Composition & Process Steps)

In Example 6 given above, where 13 ppm potassium bromate was incorporated into the bread dough to produce 1.4 ppb residual bromate in the open top bread, an aqueous ferrous sulfate solution (0.1% as concentration, 5 g) was sprayed over the uncovered upper surface (open area of a baking pan: about 450 cm$^2$) of the proofed bread dough before baking.

(Result)

The open top bread was evaluated for the content of residual bromate as described above, indicating that residual bromate was ND.

As is evident from this result, the present invention allows significant reduction, and hence prevention, of residual bromate in open top bread by spraying an aqueous ferrous sulfate solution over the surface of the proofed bread dough before baking, as compared to open top bread baked without spraying. This embodiment is therefore extremely effective in incorporating a relatively large amount of potassium bromate.

Examples 11 to 13

(Ingredient Composition & Process Steps)

In Example 1 given above, the following solution (5 g) was sprayed over the uncovered upper surface (open area of a baking pan: about 450 cm$^2$) of the proofed bread dough before baking:

water (Example 11);

an aqueous L-ascorbic acid solution (0.1% as concentration) (Example 12); or a mixture of an aqueous ferrous sulfate solution (0.18% as concentration) and an aqueous L-ascorbic acid solution (0.24% as concentration)(Example 13).

(Result)

The open top bread from each example was evaluated for the content of residual bromate as described above, indicating that residual bromate was ND in each of Examples 11 to 13.

Examples 14 to 15

(Ingredient Composition & Process Steps)

In Example 6 given above, where 13 ppm potassium bromate was incorporated into the bread dough to produce 1.4 ppb residual bromate in the open top bread, the bread dough was covered with a dome-type lid during baking (Example 14). Example 6 was also modified to incorporate 14.3 ppm potassium bromate into the bread dough, which was covered with a dome-type lid during baking (Example 15).

(Result)

The bread from each example was evaluated for the content of residual bromate as described above, indicating that residual bromate was ND in each of Examples 14 and 15. This demonstrates that the present invention allows complete prevention of residual bromate in bread by using a dome-type lid during baking, as compared to open top bread baked in an uncovered baking pan. This embodiment is therefore extremely effective in incorporating a relatively large amount of potassium bromate.

Example 16

Making Pullman Type Bread

| | (Ingredient composition) | |
|---|---|---|
| Sponge | Wheat flour (strong flour) | 70% |
| | Yeast | 2% |
| | Dough conditioner | 0.1% |
| | (e.g., yeast food, enzyme) | |
| | including L-ascorbic acid (uncoated) | 20 ppm |
| | Emulsifier | 0.3% |
| | Water | 40% |
| | Aqueous potassium bromate | |
| | solution (0.13% as concentration) | |
| | (as potassium bromate) | 15 ppm |
| | Ferrous sulfate | 15 ppm |
| Dough | Wheat flour (strong flour) | 30% |
| | Sugar | 7% |
| | Fat | 5% |
| | Skimmed milk powder | 2% |
| | Salt | 2% |
| | Water | 28% |

-continued (Process steps)

| | | |
|---|---|---|
| Sponge | Mixing | Low speed 3 minutes, High speed 2 minutes |
| | Temperature of mixed sponge | 24° C. |
| | Fermentation | 4 hours |
| Dough | Mixing | Low speed 2 minutes, High speed 3 minutes ↓ (add fat) Low speed 2 minutes, High speed 6 minutes |
| | Temperature of mixed dough | 27° C. |
| | Floor time | 20 minutes |
| | Dividing | 500 g |
| | Bench time | 20 minutes |
| | Moulding into M-shape (curl each sheeted dough into a M-shaped roll) | |
| | Panning (place three M-shaped rolls into a baking pan) | |
| | Final proofing | 38° C., 50 minutes |
| | Baking (covered) | 210° C., 33 minutes |

Pullman type bread was made under these conditions.

(Evaluation)

Content of residual bromate was determined as described in the Journal of the Food Hygienics Society of Japan, supra.

(Result)

The bread was evaluated for the content of residual bromate as described above (detection limit: 1 ppb), indicating that residual bromate was ND.

This demonstrated that the present invention also allows prevention of residual bromate in pullman type bread by incorporating potassium bromate as an aqueous solution even in an amount of 15 ppm (as potassium bromate).

The pullman type bread thus prepared also had good loaf volume, flavor and taste which were not affected by ferrous sulfate.

Examples 17 to 18

The same ingredients as shown in Example 1 were used, except that potassium bromate was incorporated in an amount of 10.4 ppm (Example 17) or 7.8 ppm (Example 18), to make open top bread in the same manner as shown in Example 1. The open top bread from each example was evaluated for its loaf volume and specific volume and also evaluated for an extensogram of the fermented dough. Each result was expressed as the mean of five samples for each example.

Table 1 shows the results obtained, along with the results of Comparative Test 2 below.

TABLE 1

| | Comparative Example 3 | Example 1 | Example 17 | Example 18 |
|---|---|---|---|---|
| Potassium bromate (ppm) | 11.7 | 11.7 | 10.4 | 7.8 |
| One loaf volume (ml) | 1,155 | 1,173 | 1,122 | 1,109 |
| Weight after baking (g) | 229.6 | 228.8 | 229.9 | 231.1 |
| Specific volume | 5.0 | 5.1 | 4.9 | 4.8 |
| Extensogram of fermented dough | | | | |
| F value (B.U.) | 577 | 627 | 616 | 608 |
| E value (mm) | 94 | 97 | 95 | 96 |
| F/E | 6.1 | 6.5 | 6.5 | 6.3 |

TEST EXAMPLES

Comparative Test 1

The open top bread samples prepared in Example 1 above and Comparative Examples 1 to 3 below were evaluated and compared for the content of residual bromate by improved HPLC analysis as mentioned above (which was also adapted to the following Comparative Tests).

(Ingredient composition for Comparative Example 1)

The same ingredients as shown in Example 1 were used, except that potassium bromate was incorporated in powder form and that ferrous sulfate and ascorbic acid were not incorporated.

(Ingredient Composition for Comparative Example 2)

The same ingredients as shown in Example 1 were used, except that ferrous sulfate and ascorbic acid were not incorporated. In this comparative example, potassium bromate was incorporated as an aqueous solution.

(Ingredient Composition for Comparative Example 3)

The same ingredients as shown in Example 1 were used, except that potassium bromate was incorporated in powder form. In this comparative example, ferrous sulfate and ascorbic acid were incorporated.

(Process Steps for Comparative Examples 1 to 3)

The same steps as shown in Example 1 were repeated.

(Result)

The open top bread from each example was evaluated for the content of residual bromate as described above, indicating that residual bromate was ND in Example 1. In contrast, residual bromate was 20.2 ppb, 12.7 ppb and 6.2 ppb in Comparative Examples 1, 2 and 3, respectively. This demonstrates that the present invention allows significant reduction, and hence prevention, of residual bromate in open top bread, as compared to Comparative Examples 1 to 3.

Comparative Test 2

The open top bread samples prepared in Examples 1, 17 and 18 and Comparative Example 3 were evaluated for their loaf volume and specific volume and also evaluated for an extensogram of the fermented dough. In Examples 17 and 18, the same ingredients as shown in Example 1 were used, except that potassium bromate was incorporated in an amount of 10.4 ppm and 7.8 ppm, respectively. Each result was expressed as the mean of five samples for each example.

(Result)

Table 2 shows the results obtained.

TABLE 2

| | Comparative Example 3 | Example 1 | Example 17 | Example 18 |
|---|---|---|---|---|
| Potassium bromate (ppm) | 11.7 | 11.7 | 10.4 | 7.8 |
| One loaf volume (ml) | 1,155 | 1,173 | 1,122 | 1,109 |
| Weight after baking (g) | 229.6 | 228.8 | 229.9 | 231.1 |
| Specific volume | 5.0 | 5.1 | 4.9 | 4.8 |

TABLE 2-continued

|  | Comparative Example 3 | Example 1 | Example 17 | Example 18 |
|---|---|---|---|---|
| Extensogram of fermented dough |  |  |  |  |
| F value (B.U.) | 577 | 627 | 616 | 608 |
| E value (mm) | 94 | 97 | 95 | 96 |
| F/E | 6.1 | 6.5 | 6.5 | 6.3 |

As shown in Table 2, when potassium bromate was incorporated in an amount of 11.7 ppm, both loaf and specific volumes of the open top bread were larger in Example 1 according to the present invention than in Comparative Example 3. In other words, the present invention requires a smaller amount of potassium bromate than Comparative Example 3 to obtain open top bread of the same loaf and specific volumes.

Likewise, when potassium bromate was incorporated in an amount of 11.7 ppm (Example 1), 10.4 ppm (Example 17) and 7.8 ppm (Example 18), both F (resistance) and E (extensibility) values of extensogram were higher in these Examples than in Comparative Example 3 (11.7 ppm). In particular, the F (resistance) value was much higher in Examples 1, 17 and 18 than in Comparative Example 3. As is well known, potassium bromate serves as an oxidizing agent to toughen and tighten wheat gluten in a bread dough by its oxidizing action, so that the bread dough attains elasticity and gas-holding capacity required for great expansion during final proofing and baking. As is evident from the F (resistance) and E (extensibility) values of extensogram given above, in all of Examples 1, 17 and 18 according to the present invention, potassium bromate even in an equal or smaller amount than used in Comparative Example 3 has a strong oxidizing effect on wheat gluten in a bread dough and hence provides the bread dough with great elasticity, gas-holding capacity, extensibility and flexibility.

Comparative Test 3

Open top bread was made in the same manner as shown in Example 1, except that the dough conditioner (including L-ascorbic acid) and ferrous sulfate were added in the dough mixing step rather than incorporated into the sponge (Comparative Example 4). The open top bread samples prepared in Example 1 and Comparative Example 4 were evaluated and compared for the content of residual bromate.

(Result)

The content of residual bromate in the open top bread was evaluated as described above, indicating that residual bromate was ND in Example 1, but 10.4 ppb in Comparative Example 4.

This demonstrates that in preparing a bread dough by the sponge and dough process, prevention of residual bromate in open top bread can be accomplished by incorporating three ingredients, potassium bromate in aqueous solution form, ferrous sulfate and ascorbic acid, in the step of forming a sponge.

The present invention provides a method for preparing a bread dough, which comprises incorporating potassium bromate as an aqueous solution, in combination with ferrous sulfate and ascorbic acid in the step of forming a sponge such that the solubility of the incorporated potassium bromate is increased in the bread dough to facilitate chemical decomposition of bromate, so that the resulting baked breads are free from residual bromate. Also provided is a method for making breads, which comprises baking the bread dough.

According to the present invention, it is possible to provide a bread dough which allows improved oven spring in the baking step and hence increased loaf volume. Also, a significantly reduced amount of ferrous sulfate can be incorporated into the bread dough, so that the loaf volume, flavor and taste of baked breads are not affected by ferrous sulfate. The method of the present invention is widely applicable to bread dough preparation.

What is claimed is:

1. A method for making open top bread, said method comprising:
   incorporating potassium bromate as an aqueous solution, as well as incorporating ferrous sulfate and ascorbic acid in powder form independently of the aqueous solution of potassium bromate, in the step of forming a sponge in the sponge and dough process to prepare a bread dough,
   spraying an aqueous solution of ferrous sulfate or an aqueous solution of ferrous sulfate and ascorbic acid over the upper surface of the proofed bread dough before baking; and
   baking the bread dough in an uncovered baking pan,
   wherein the baked bread has residual bromate at a level below the detection limit of 1 ppb, as measured by improved HPLC analysis, and
   the amounts of said potassium bromate, ferrous sulfate and ascorbic acid are 8-15 ppm, 10-20 ppm, and 10-50 ppm, respectively, based on the total wheat flour required to prepare the bread dough.

2. The method according to claim 1, wherein the bread dough is baked at a temperature of from 160 to 180° C.

3. The method according to claim 1, wherein the bread has an uncolored or light-colored crust.

4. The method according to claim 1, wherein the aqueous solution is sprayed in an amount of 3 g to 7 g per 450 cm$^2$.

* * * * *